Figure 3:
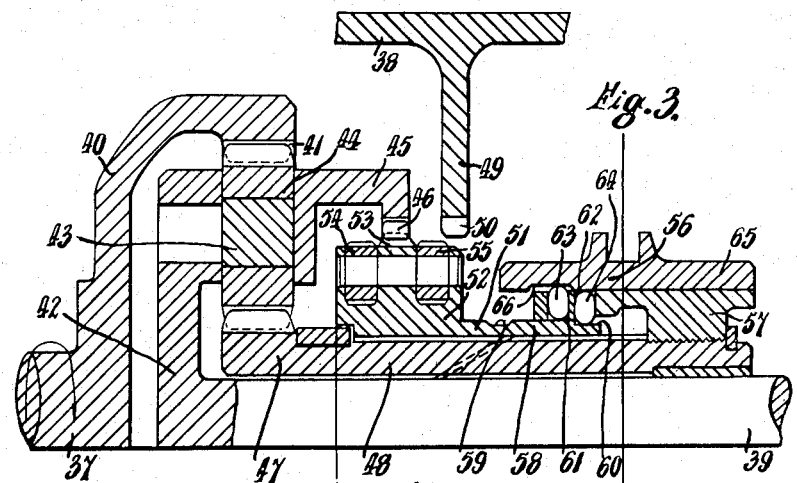

Feb. 7, 1956   P. J. SHORT   2,733,791
SYNCHRONIZING COUPLING DEVICES
Filed Oct. 23, 1951   2 Sheets-Sheet 1
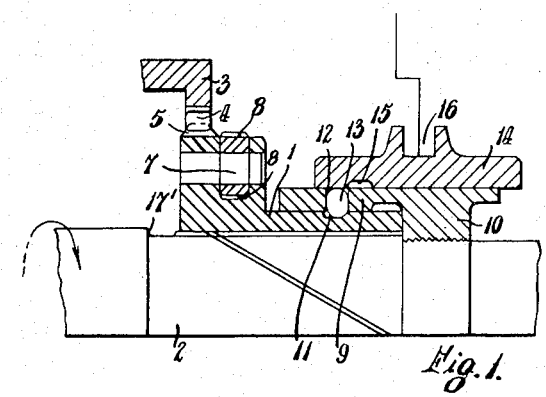
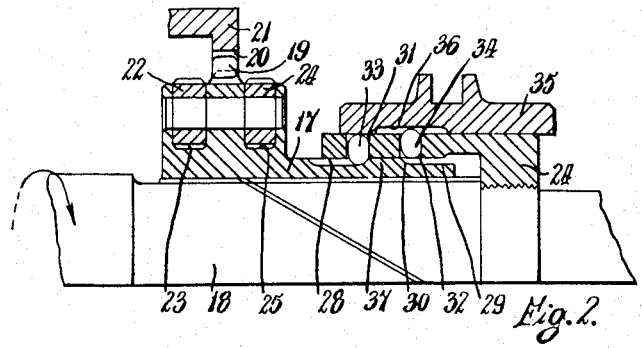
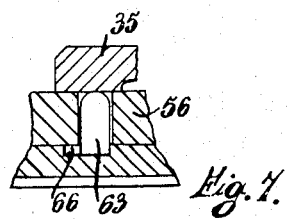

Feb. 7, 1956 P. J. SHORT 2,733,791
SYNCHRONIZING COUPLING DEVICES
Filed Oct. 23, 1951 2 Sheets-Sheet 2

Inventor
Philip John Short
by
Leon Fairbank Hirsch
his Attorney

United States Patent Office 2,733,791
Patented Feb. 7, 1956

2,733,791

SYNCHRONIZING COUPLING DEVICES

Philip John Short, Isleworth, England, assignor to S. S. S. Gears Limited, Isleworth, England, a British company Application October 23, 1951, Serial No. 252,743

Claims priority, application Great Britain October 27, 1950

11 Claims. (Cl. 192—18)

This invention relates to a mechanical synchronising coupling device which is a modification of the Legge synchro-coupling described in British patent specifications Nos. 354,711 and 410,083. The invention is concerned with a coupling device for use in rotary power transmission mechanism and of the kind having at least two coaxial and relatively rotatable members the first of which has teeth; a toothed intermediate member so mounted on the second member as to be constrained to move helically thereon into and out of mesh with the first member, at least one pawl on one of said toothed members positioned to engage the teeth on the other of said toothed members and thereby to shift the intermediate member into mesh with the first member when the second member tends to rotate in one direction relatively to the first member, and a locking member slidable axially of the coupling and movable to a position in which it prevents disengagement, in at least one axial direction, of the intermediate member from the first member.

In coupling devices of this kind at present in use the locking member is a slidable sleeve having internal splines co-operating with external splines on the intermediate member and on a stop member splined to the second member, so as to provide a rotational stop for limiting displacement of the intermediate member relative to the second member. Such a construction is relatively expensive since it involves not only the machining of the various locking splines, but also their accurate angular relationship.

An object of this invention is to provide comparatively simple and inexpensive locking means for such coupling devices.

According to this invention, a coupling device of the kind hereinbefore referred to includes a locking plunger carried by the second member for movement between an inoperative position and an operative position in which it co-operates with an abutment surface on the intermediate member to form an axial stop preventing movement of the intermediate member in an axial direction out of engagement with the first member, the axially slidable locking member being adapted to displace said plunger from its inoperative to its operative position.

The locking plunger may be slidable in a radial hole in a sleeve which surrounds a part of the intermediate member and which is rigid with a helically splined shaft. The intermediate member is engaged on this shaft, which constitutes the second member of the coupling, the locking member being an outer sleeve slidable on the first-mentioned sleeve.

In order that the invention may be clearly understood and readily carried into effect, it will now be described in more detail with reference to the accompanying drawings, in which:

Fig. 1 is a longitudinal sectional view of a coupling device incorporating the invention and capable of serving alternatively as a unidirectional free-wheel and as a coupling capable of transmitting torque in both directions of rotation, Fig. 2 is a longitudinal sectional view of an invertible free-wheel coupling incorporating the invention, Figs. 3 to 6 are longitudinal sectional views of a coupling device according to the invention incorporated in a two-speed gearing, the respective figures showing four different conditions of adjustment of the gearing, and Fig. 7 shows a modified form of locking plunger.

In a coupling device of the kind hereinbefore specified the intermediate member may be movable from an engaged position, in which its teeth are in engagement with the teeth of the first member and in which its abuts a stop on the second member preventing axial movement in one direction, to a free-wheeling position in which its teeth are out of engagement with the teeth of the first member, and in this case the locking plunger provided according to this invention may be movable to its operative position when the intermediate member is in its engaged position, the plunger then serving to prevent axial movement of the intermediate member in the other direction to its disengaged position, so that the coupling device is rendered capable of transmitting torques in both directions.

A coupling having these features is shown in Fig. 1, in which reference numeral 1 indicates an intermediate member formed with an internally splined hollow member engaged with a right-handed helically splined driven shaft 2 which constitutes the second member of the coupling. The first member of the coupling is constituted by an output member 3 provided with teeth 4. Member 3 may be a gear wheel on which the teeth 4 project radially outward, or it may be an annulus gear in which the teeth 4 are formed internally and which is mounted coaxially with shaft 2. The intermediate member is movable axially on shaft 2 from a forward free-wheeling position in which its teeth 5 are axially displaced to one side of the teeth 4 of member 3 (to the left of the position shown in Fig. 1) to a position in which its teeth 5 engage with the teeth 4 as shown. One or more pawls 6, movable angularly about a pin 7, are disposed in an annular recess 8 in the intermediate member 1, said pawls being positioned and directed so that when the intermediate member 1 is in its left-hand position the pawls 6 either engage the teeth 4 of member 3 or are over-run by the teeth 4 according to the relative speeds of the driven shaft 2 and the output member 3, as will be described.

The locking means according to the invention, in the example illustrated, include a cage 9 formed by a sleeve having a smooth outer surface and an internal flange 10 which is screw-threaded on to the shaft 2, the sleeve projecting from the flange 10 towards the member 3 and around a tubular portion of the intermediate member 1. This tubular portion has a shallow circumferential recess 11. Radial bores 12 (one of which is shown) distributed uniformly in a circular array, are provided through the sleeve of cage 9 and accommodate a set of locking plungers 13. The length of these plungers 13 exceeds the thickness of the sleeve. A locking sleeve 14 is axially slidable on the cage 9, the inner surface of the locking sleeve being provided with a circumferential groove 15 wide enough to admit the plungers 13. The sleeve 14 may be axially slidable by means of a control mechanism, comprising a fork which engages an annular recess 16 in the locking sleeve 14.

In operation, assuming that shaft 2 is driven in the direction of the arrow, and the intermediate member 3 is in its disengaged (left-hand) position, so long as the shaft 2 is rotating so slowly that the peripheral speed of teeth 5 is less than that of the teeth 4 of the output member 3, the teeth 4 overrun the pawls 6. When the input shaft 2 is accelerated, or the output member 3 decelerates, the teeth 4 and 5 attain synchronism and the pawls 6 engage the teeth 4 and displace the intermediate member 1 axially along the splined part of shaft 2 (to the right) until the teeth 4 and 5 are in engagement as shown. When the teeth 4 and 5 are in full engagement further axial movement of the intermediate member 1 is prevented by the member 1 abutting against the flange 10, which serves as an axial stop, whereupon torque is transmitted from the shaft 2 to the member 3. Intermediately as the torque is reversed the intermediate member 1 moves to the left to its disengaged position, its movement being limited by an axial stop formed by a shoulder 17' on the shaft 2. The parts are so proportioned that when the intermediate member 1 is in its engaged position, as shown, the radial bores 12 in the cage 9 register with the groove 11 in the intermediate member 1 and the plungers are able to move radially inwards so that the locking sleeve 14 can be moved axially. In the axial position shown, in which it prevents outward movement of the plungers, the latter, by projecting into the groove 11 in the intermediate member 1, prevent axial movement of the intermediate member 1 on the shaft, whereby the intermediate member is prevented from disengaging with the output member 4 and the coupling is locked for the transmission of torque in either direction. If the locking sleeve 14 is moved to the left from the position shown, until the groove 15 registers with the bores 12, the latter are capable of moving outwardly so as to unlock the intermediate member 1 from the shaft 2. The intermediate member 1 is then free to move so as to drivably engage with or disengage from the output member 3 according to the direction of torque transmission as above described.

The plungers 13 are formed by short rods rounded at both ends and the side of the groove 15 is similarly rounded so that when the intermediate member is in engaged position and the locking sleeve is in the left-hand or non-locking position, movement of the locking sleeve 14 to locking position causes the plungers to move inwards into the groove 11. The groove 11 is arcuate in cross-section to conform to the rounded inner ends of the plungers so that with the intermediate member 1 in engaged position and the locking sleeve 14 in non-locking position the movement of the intermediate member 1 to its disengaged position causes the plungers 13 to move outwardly out of the groove 11.

The improved coupling device may include a second locking plunger carried by the second member for movement between an inoperative position and an operative position in which it co-operates with an abutment surface on the intermediate member to form an axial stop limiting movement of the intermediate member in the axial direction opposite to that in which movement is prevented by the first-mentioned locking plunger, the axially slidable locking member being adapted to render said plungers alternatively operative.

An example of such a coupling device having two locking plungers is an invertible free-wheel coupling, that is to say, a coupling which in one condition will transmit torque applied in one direction and free-wheel under torque applied to the opposite direction and which in another condition will transmit torque applied in the said opposite direction and free-wheel under torque applied in the said one direction. An example of such a coupling device is shown in Fig. 2, in which the intermediate member is an internally splined hollow member 17 engaged with a helically splined driven shaft 18 which constitutes the second member. The intermediate member 17 is movable from a forward free-wheeling position in which its teeth 19 are axially displaced to one side of the teeth 20 of the first member 21, which may be a gear wheel or an annulus gear as in the case of Fig. 1, through an engaged position, in which its teeth 19 are in mesh with the teeth 20 of the first member 21 as shown, to a backward free-wheeling position in which its teeth are axially displaced to the other side of the teeth of the first member 21. One or more pawls 22 are disposed in an annular recess 23 on one side of the teeth 19, and one or more pawls 24 are disposed in an annular recess 25 on the other side of the teeth 19. The pawls 22 and 24 are oppositely directed, so that when the pawls 22 engage the teeth 20 of member 21 the shaft 18 can overrun the member 21 and when the pawls 24 engage the teeth 20 the member 21 can overrun the shaft 18. When, with either set of pawls in engagement with the teeth 20, the direction of torque transmission is reversed the engaged pawls shift the intermediate member from the backward free-wheeling position to the engaged position under torque applied in the forward direction between the first and second members, or shift the intermediate member from the forward free-wheeling position to the engaged position under torque applied in the backward direction between the first and second members, according to which set of pawls is engaged. The locking means shown in Fig. 2 comprise a cage 24 formed by a sleeve having a smooth cylindrical outer surface and having an internal flange 27 at one end screw-threaded to the helically splined shaft 18, the cage sleeve projecting from the flange 27 towards the output member 21 and around a tubular portion of the intermediate member 17. This tubular portion has a shallow circumferential groove 28 which has radiussed ends, and an end 29 of reduced diameter a rounded shoulder being provided. Two rings of uniformly distributed radial bores 31 and 32 are provided through the cage sleeve, accommodating respectively two sets of locking plungers 33 and 34. The length of these plungers exceeds the thickness of the cage sleeve. A locking sleeve 35 is axially slidable on the cage sleeve by means of a control mechanism, and the inner surface of the locking sleeve 35 is provided with a circumferential groove 36 wide enough to embrace the two rings of locking plungers.

The parts are so proportioned that, when the intermediate member 17 is in its unlocked position, either of the two rings of plungers 33 and 34 can be depressed, in consequence of sliding of the locking sleeve 35 in one axial direction or the other from an unlocked position, and thereby caused to engage respectively on the one or the other side of the shallow circumferential flange 37 on the intermediate member, formed by the groove 28 and reduced end 29. Thus, when the locking sleeve 35 is in its unlocked position in which the groove 36 projects over both sets of plungers, the intermediate member 17 can screw freely between the forward and backward free-wheeling positions, the coupling device being bidirectionally free. However, when the coupling is in either of the free-wheeling conditions, the locking sleeve 35 can be shifted in one axial direction or the other from its unlocked position to render operative the ring of locking plungers that is adapted to prevent the intermediate member from running beyond the engaged position to the opposite free-wheeling position.

The invention is also applicable to a coupling device for use in rotary power transmission gearing for selecting one or other of at least two alternative gear ratios, the device being of the kind having three coaxial and relatively rotatable members, the first and third of which have teeth, a toothed intermediate member so mounted on the second member as to be constrained to move helically thereon from a first position where said first and intermediate members are in mesh together, through a second position where said teeth are disengaged, to a third position where said third and intermediate members are in mesh together, pawls on at least one of said toothed members positioned to engage teeth on the remainder of said toothed members and thereby to shift the intermediate member from the second position to the first position when the intermediate member tends to rotate in one direction relatively to the first member and to shift the intermediate member from the second position to the third position when the intermediate member tends to rotate in the other direction relatively to the third member, and a locking member slidable axially of the coupling between a first location in which it prevents movement of the intermediate member from said first to said second position and a second location in which it prevents movement of the intermediate member from said third to said second position. Coupling devices of this kind are described in British patent specification No. 486,589 with reference to Figs. 2 and 8 thereof.

An example of such a selective coupling device, incorporating the invention, includes a first locking plunger carried by the second member for movement between an inoperative position and an operative position in which it co-operates with an abutment surface on the intermediate member to form an axial stop preventing movement of the intermediate member from said first to said second position, a second locking plunger carried by the second member for movement between an inoperative position and an operative position in which it co-operates with an abutment surface on the intermediate member to form an axial stop preventing movement of the intermediate member from said third to said second position, and an axially slidable locking member serving as it enters two alternative locations to displace the two locking plungers respectively from their inoperative to their operative positions.

The intermediate member is preferably so shaped as to maintain both locking plungers in their inoperative positions so long as the intermediate member is at any intermediate point in its range of movement between said first and third positions. Consequently the locking member has to move in two steps; in the first step it leaves the first (or the second) location and releases the first (or the second) plunger to its inoperative position, unlocking the intermediate member; as the intermediate member thereafter completes its movement into the third (or first) position, the locking member can carry out its second step and move the second (or the first) locking plunger into its operative position.

An embodiment of the invention in the last-mentioned form, as applied to a two-speed planetary gearing, is shown in Figures 3 to 6. The gearing shown has a driven shaft 37 projecting from the front end of a gear case, part of which is shown at 38, and a driving or output shaft 39 projecting from the rear end of said gear case. A drum 40 opening towards the rear is fixed to the rear end of the input shaft 37 and is provided with internal teeth 41 forming an annulus gear. Fixed to the front end of the output shaft 39 is a planet-carrier disk 42 having three or more rearwardly projecting pins 43 on which are rotatably mounted planet pinions 44 each meshing with the annulus gear 41. To the rear ends of the pins 43 is fixed a rearwardly projecting tubular member 45 provided at its rear end with a ring of jaw-clutch teeth 46 projecting radially inwards. The planet-carrier assembly constitutes the above-mentioned first member of the coupling. A sun wheel 47 meshing with each of the planet wheels 44 is fixed to the front end of a hollow sun shaft 48 which surrounds the output shaft 39 and which constitutes the above-mentioned second member of the coupling. The middle part of the length of this sun shaft 48 has external right-handed helical splines of steep pitch.

An annular plate 49 fixed to or formed integrally with the gear case 29 is provided on its inner border with a ring of jaw-clutch teeth 50 behind and spaced from the teeth on the planet-carrier 42. This plate 49 constitutes the above-mentioned third member of the coupling. A hollow intermediate member 51 has internal splines engaged with the splines of the sun shaft 48. Near the front end of the intermediate member 51 is a circumferential flange 52 extending radially outwards and provided with jaw-clutch teeth 53. The intermediate member 51 is movable helically on the sun shaft 48 between stops, to be described, from a first position in which the teeth 53 of the intermediate member 51 are in mesh with the teeth 46 of the planet-carrier, through a second position in which the teeth 53 of the intermediate member 51 are axially behind the planet-carrier teeth 46, and in front of the teeth 53 of the fixed plate 49, to a third position in which the teeth 53 of the intermediate member 51 are in mesh with the teeth 50 of the fixed plate 49. In an annular recess towards the front of the flange 52 of the intermediate member 51 are pawls 54 the noses of which face clockwise as viewed from the front of the gearing and which are so placed as to co-operate with the planet-carrier teeth 46 when the intermediate member 51 is in its second position and feed the teeth 53 on the intermediate member 51 smoothly into mesh with the planet-carrier teeth 46 when the sun shaft 48 tends to rotate clockwise relatively to the planet-carrier 42. In an annular recess towards the rear of the flange 52 of the intermediate member 51 are pawls 55 the noses of which face counterclockwise as viewed from the front of the gearing and which are so placed as to co-operate with the teeth 50 of the fixed plate 49 when the intermediate member 51 is in its second position and feed the teeth 53 on the intermediate member 51 smoothly into mesh with the teeth 50 on the fixed plate 49 when the sun shaft 48 tends to rotate counterclockwise with respect to the planet carrier 42.

The gearing as described so far as of known construction. The locking means provided in accordance with the form of the invention shown are arranged as follows. A cage is formed by a sleeve 56 having a smooth cylindrical outer surface and an internal flange 57 near its rear end. This flange 57 is fixed to the rear end of the sun shaft 48 and forms one of the above-mentioned stops for limiting the travel of the intermediate member 51 on the sun shaft 48. The cage sleeve 56 extends forwards around a tubular rearward extension 58 of the intermediate member 51. This extension 58 is a running fit in the cage sleeve 56, except for a circumferential groove 59 forming an underdrive stop and for a shouldered rear end portion 60 where the external diameter is reduced to form a direct drive stop. The cage sleeve 56 is provided with two rings of uniformly distributed radial bores 61 and 62 accommodating respectively underdrive locking plungers 63 and direct drive locking plungers 64 axially behind the underdrive plungers 63. The length of the plungers 63 and 64 exceeds the thickness of the cage sleeve 56. A locking sleeve 65 is axially slidable on the cage sleeve 56 for example by means of a control system embodying a double-acting spring link, and the inner surface of the locking sleeve 56 is provided with a circumferential groove 66 wide enough to embrace the two rings of locking plungers. The parts are so proportioned that, firstly, when the intermediate member 51 is in the first position as shown in Fig. 3 with its jaw clutch teeth 53 in engagement with the planet-carrier teeth 46, the direct drive locking plungers 64 can engage behind the shoulder at the reduced rear end portion 60 of the intermediate member 51, secondly, when the intermediate member 51 is in the second or disengaged condition, all the plungers 63 and 64 are on the part of the intermediate member 51 between its reduced rear end 60 and the groove 59, and thirdly, when the intermediate member is in the third position, with its teeth 53 in engagement with the teeth 50 of the fixed plate 49, the underdrive locking plungers 63 can engage in the groove 59 in the intermediate member 51.

The gearing operates as follows.

Direct drive is established when the intermediate member 51 is in its first position, with its teeth 53 engaged with the planet-carrier teeth 46. The direction of rotation of the driving shaft is clockwise as viewed from the front. Under these conditions, driving torque on the gearing causes on the sun wheel 47 a reaction tending to rotate this wheel 47 counterclockwise relatively to the planet-carrier 42, and the resulting torque on the helical splines urges the intermediate member 51 to move rearwards along the sun shaft 48. However, the locking sleeve 65 is in its first location, i. e. at the limit of its travel towards the front of the gearing, and the direct drive locking plungers 64 are thereby held with their inner ends engaged behind the shoulder near the rear end of the intermediate member 51. These plungers 64 thus form an axial stop preventing rearward movement of the intermediate member 51 on the main shaft 48. The planetary train is thus locked solid. Under these conditions the underdrive locking plungers 63 project into the rear portion of the groove 66 in the locking sleeve 65.

Figure 4:
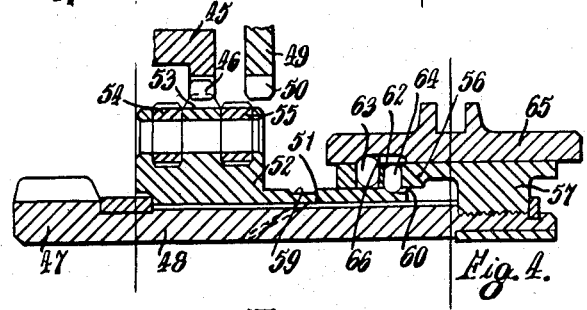
Figure 5:
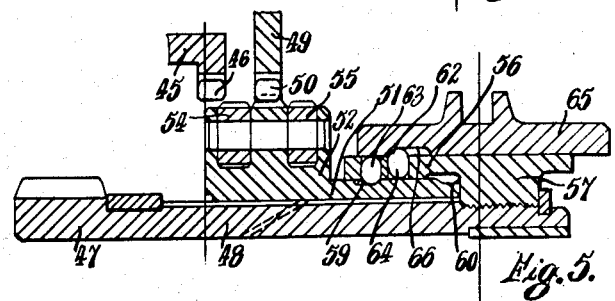

The change to underdrive is initiated by urging the locking sleeve 65 to the rear, the torque load on the gearing, if necessary, being momentarily reduced or interrupted in order to relieve the outward thrust of the direct drive locking plungers 64 against the locking sleeve 65 and allow the latter to slide. The locking sleeve 65 now moves rearwards until the front side of the groove 66 therein abuts against the projecting ends of the underdrive locking plungers 63, which are prevented from moving inwards since their inner ends are resting on the part of the intermediate member 51 between the shoulder and the underdrive locking groove 59 (Fig. 4). The rear part of the locking sleeve 65 now registers with the direct drive locking plungers 64 which are thus rendered free to move outwards clear of the shoulder on the intermediate member 51, so that the latter can move rearwards to its second position on the sun shaft 48 under the effect of the driving torque reaction on the helical splines. While the intermediate member 51 is in its second position the two sets of pawls ratchet respectively over the planet-carrier teeth 46 and the teeth on the fixed plate 50, and the driven shaft 37 accelerates until the sun shaft 48 tends to rotate backwards. Thereupon the rear set of pawls 55 engage the teeth 50 of the fixed plate 49 and the helical splines act to move the intermediate member 51 to the rear until its teeth 53 are fully engaged with the teeth of the fixed plate 49. As the intermediate member 51 completes this rearward movement into its third position, the underdrive locking groove 59 in it comes into register with the underdrive locking plungers 63 so that the locking sleeve 65 can complete its rearward movement into its second location, the front wall of the groove 66 in the locking sleeve 65 riding over these plungers 63 and moving them radially inwards (Fig. 5). The gearing is now locked in the underdrive condition, the tendency of the intermediate member 51 to move forwards under the effect of overrrunning torque being resisted by engagement of the underdrive locking plungers 63 in the underdrive locking groove 59 in the intermediate member 51.

Figure 6:
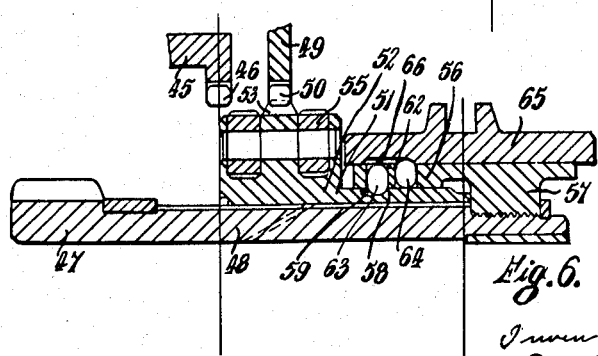

The change from underdrive to direct drive is initiated by urging the locking sleeve 65 from its second to its first location. The locking sleeve 65 moves forward initially until the rear wall of the groove 66 abuts against the outer ends of the direct drive locking plungers 64. The underdrive locking plungers 63 are now in register with the front part of this groove 66 (Fig. 6). The driven shaft 37 is now retarded while the rotation of the output shaft 39 is maintained by the inertia of the load driven by it. The sun shaft 48 accordingly begins to rotate forwards and the helical splines act to move the intermediate member 51 forwards out of mesh with the fixed plate 49. When the speed of the sun shaft tends to exceed the speed of the shaft 39, the front pawls 54 on the intermediate member 51 engage the planet-carrier teeth 46 and the helical splines act to move the intermediate member 51 forwards until its teeth 53 are fully engaged with the planet-carrier teeth 46. As the intermediate member 51 completes this forward movement into its first position, the direct drive locking shoulder on its passes to the front of the direct drive locking plungers 64 so that the locking sleeve 65 can complete its forward movement into its first location, the rear wall of the groove 66 in the locking sleeve 65 riding over these plungers 64 and moving them radially inwards (Fig. 1). The gearing is now locked in the direct drive condition, the tendency of the intermediate member 51 to move rearwards under the effect of driving torque being resisted by engagement of the direct drive locking plungers 64 behind the shoulder on the intermediate member 51.

The underdrive locking plungers 63 may be fewer in number than the direct drive locking plungers 64 owing to the smaller thrust which the former are required to resist.

In the examples hereinbefore described the locking plungers are short rods each having both ends radiused for co-operation with correspondingly radiused shoulders on the intermediate member 51 and in the locking sleeve 65. Alternatively, provided the cage sleeve 56 is made thin enough, the locking plungers may be balls. As a further alternative, in circumstances in which the helically splined shaft 48 rotates in all running conditions, the radially inner ends of the locking plungers may be rectangular and may co-operate with rectangular shoulders, as illustrated in Fig. 7. In this construction centrifugal force is relied on to disengage the locking plungers 63 and 64, and the abutment shoulders are comparatively low.

I claim:

1. A coupling device comprising first and second coaxial relatively rotatable members, the first of which has teeth, a toothed intermediate member constrained to move helically on said second member into and out of engagement with said first member, and formed with an abutment surface, means for automatically shifting said intermediate member into engagement with said first member when said second member tends to rotate in one direction relatively to the first member, at least one locking plunger carried by a part permanently fast with said second member, and movable into and out of an operative position in which it cooperates with said abutment surface to prevent movement of said intermediate member in one direction, and a locking member slidable axially of the coupling on said part permanently fast with said second member into and out of a position in which it prevents movement of said locking plunger from its operative position.

2. A coupling device according to claim 1, wherein said part is a first sleeve which surrounds part of said intermediate member and which is permanently fast with said second member, and said locking member is a second sleeve slidable on said first sleeve, and wherein said locking plunger is slidable in a hole in said first sleeve.

3. A coupling device according to claim 1, wherein said intermediate member is movable on said second member from an engaged position in which its teeth are in engagement with the teeth of said first member and in which it abuts a stop on said second member, to a free-wheeling position in which its teeth are out of engagement with the teeth of said first member, said locking plunger being movable to its operative position when the intermediate member is in its said engaged position and serving when locked in its said operative position by said locking member to prevent movement of the intermediate member to its said disengaged position.

4. A coupling device according to claim 1, comprising at least one further locking plunger carried by said part fast with said second member and movable into and out of an operative position in which it cooperates with a further abutment surface on said intermediate member to limit movement of said intermediate member in the direction opposite to that in which movement is prevented by said first-mentioned locking plunger when in its said operative position, said slidable locking member being adapted to lock said first-mentioned and further plungers alternatively in their operative positions.

5. A coupling device having first, second and third coaxial and relatively rotatable members, the first and third of which have teeth, a toothed intermediate member so mounted on said second member as to be constrained to move helically thereon from a first position in which said first and intermediate members are in mesh with one another, through a second position in which said first and intermediate members are disengaged, to a third position in which said third and intermediate members are in mesh with one another, means for automatically shifting said intermediate member from said second position to said first position when said intermediate member tends to rotate in one direction relatively to said first member, and further means for automatically shifting said intermediate member from said second position to said third position when said intermediate member tends to rotate in the other direction relatively to said third member, at least one locking plunger carried by a part permanently fast with the second member for movement between an inoperative position and an operative position in which it cooperates with an abutment surface on said intermediate member to form an axial stop which prevents movement of said intermediate member from said first to said second position, at least one further locking plunger carried by said part for movement between an inoperative position and an operative position in which it cooperates with an abutment surface on said intermediate member to form a stop which prevents movement of said intermediate member from said third to said second position, and a locking member slidable on said part axially of said coupling and serving as it enters two alternative locations to lock said first-mentioned and further locking plungers alternatively in their operative positions.

6. A coupling device according to claim 5, wherein said intermediate member is so shaped as to maintain said first-mentioned and further plungers in their inoperative positions so long as said intermediate member is at any intermediate point in its range of movement between said first and third positions.

7. A coupling device according to claim 1, wherein said locking plunger is constituted by a ball.

8. A coupling device according to claim 1, wherein said locking plunger has a rectangular radially inner end.

9. A coupling device according to claim 5, wherein said first-mentioned and said further locking plungers are each constituted by a short rod having both ends radiused.

10. A coupling device according to claim 5, wherein said first-mentioned and said further locking plungers are each constituted by a ball.

11. A coupling device according to claim 5, wherein said first-mentioned and said further locking plungers each have a rectangular radially inner end.

References Cited in the file of this patent

UNITED STATES PATENTS

| | | |
|---|---|---|
| Re. 22,761 | Wemp | May 28, 1946 |
| 1,379,891 | Aichele | May 31, 1921 |
| 2,433,428 | Carnagua et al. | Dec. 30, 1947 |
| 2,510,469 | Greenlee | June 6, 1950 |